United States Patent [19]

Talmy et al.

[11] Patent Number: 5,695,725
[45] Date of Patent: Dec. 9, 1997

US005695725A

[54] METHOD OF PREPARING MONOCLINIC $BaO.Al_2O_3.2SiO_2$

[76] Inventors: Inna G. Talmy, 10222 Royal Rd., Silver Spring, Md. 20903; Deborah A. Haught, 1575 Poplar Grove Dr., Reston, Va. 22094

[21] Appl. No.: 382,979

[22] Filed: Jul. 18, 1989

[51] Int. Cl.$^6$ .................. C01F 1/00; C01B 33/26
[52] U.S. Cl. ............ 423/133; 423/155; 423/327.1; 423/328.1; 423/331; 501/8
[58] Field of Search .................. 501/8, 55, 68, 501/73, 78; 423/133, 155, 327.1, 328.1, 331

[56] References Cited

U.S. PATENT DOCUMENTS

| | | | |
|---|---|---|---|
| 3,953,220 | 4/1976 | Miller | 501/8 |
| 3,985,532 | 10/1976 | Grossman | 501/8 X |
| 4,018,614 | 4/1977 | Nordlie | 501/104 |
| 4,360,567 | 11/1982 | Guillevic | 501/8 |
| 4,687,749 | 8/1987 | Beall | 501/8 X |

*Primary Examiner*—Peter A. Nelson
*Attorney, Agent, or Firm*—John Forrest; Roger D. Johnson

[57] ABSTRACT

Monoclinic celsian ($BaO.Al_2O_3.2SiO_2$) is produced by heating a stoichiometric, powder mixture of $BaCO_3$ (or $BaC_2O_4$), $Al_2O_3$, and $SiO_2$ (preferably $SiO_2$ gel) with monoclinic celsian seeds at from 1250° C. to 1500° C.

16 Claims, No Drawings

METHOD OF PREPARING MONOCLINIC $BaO \cdot Al_2O_3 \cdot 2SiO_2$

BACKGROUND OF THE INVENTION

This invention relates to ceramics and more particularly to celsian ($BaO \cdot Al_2O_3 \cdot 2SiO_2$).

Future classes of advanced tactical missiles will require new ceramic materials for radomes to meet the stringent requirements arising from greater speeds (up to Mach 8) and longer flight times. The critical need is to develop ceramic materials stable up to at least 1400° C. with low and thermally stable dielectric constant ($\epsilon$) and loss tangent, low coefficient of thermal expansion (CTE), and high thermal shock and rain erosion resistance. While slip cast fused silica (SCFS) has excellent dielectric and thermal properties for radomes, the relatively low strength and rain erosion resistance of this material limit its future application. For this reason, research conducted in this field is directed both toward improvement of the mechanical properties of SCFS and development of new candidate ceramics. Ceramics based on silicates and aluminosilicates are considered as promising candidates for advanced radome application owing to their low CTE, relatively low dielectric constant, possibility to sinter to high density by pressureless process, and good manufacturability.

Among aluminosilicates, $BaO \cdot Al_2O_3 \cdot 2SiO_2$ (BAS) and $SrO \cdot Al_2O_3 \cdot 2SiO_2$ (SAS) appear to have the potential for meeting the requirements for radome application. Ceramics based on BAS have a melting point of about 1740° C., low CTE (about $2.5 \times 10^{-6}$/degree in the 20°–1000° C. range), and relatively low dielectric constant (~7), stable up to at least 600° C. BAS exists in two main crystalline modifications: monoclinic, stable up to 1590° C., and hexagonal, stable from 1590° C. to melting temperature. Only monoclinic BAS has the required properties. Although the hexagonal modification is stable at temperatures above 1590° C., it tends to be the first product of solid phase reaction and has a strong tendency to persist metastably. Hexagonal BAS transforms reversibly into low temperature orthorhombic form at 300° C. This transformation is accompanied by significant volume changes. Transformation of hexagonal BAS into the desirable monoclinic form is promoted by the formation of glass phase during firing, by the presence of impurities or the addition of certain additives (such as $B_2O_3$, LiF, $Cr_2O_3$, $ZrSiO_3$), and by prolonged high-temperature heating.

The presence of impurities or additives in the monoclinic BAS can adversely affect the dielectric behavior of the BAS ceramic. This will make the BAS ceramic unsuitable for many applications such as radomes where the stable transmission of electromagnetic waves is critical. Without impurities or additives, the hexagonal BAS must be heated at high temperatures (above 1450° C.) for a very long time (up to several days) for conversion into monoclinic BAS. Heating at higher temperatures produces a harder BAS product which is more difficult to grind into fine grained powders.

Therefore, it would be desirable to provide a relately low cost, low temperature process for producing pure monoclinic $BaO \cdot Al_2O_3 \cdot 2SiO_2$.

SUMMARY OF THE INVENTION

Accordingly, an object of this invention is to provide a new process for producing pure monoclinic celsian ($BaO \cdot Al_2O_3 \cdot 2SiO2$).

Another object of this invention is to provide a more economical method of producing pure monoclinic celsian ($BaO \cdot Al_2O_3 \cdot 2SiO_2$).

These and other objects of this invention are accomplished by providing:

A process for producing pure monoclinic $BaO \cdot Al_2O_3 \cdot 2SiO_2$ comprising:

Adding monoclinic $BaO \cdot Al_2O_3 \cdot 2SiO_2$ seed crystals to a mixture of powders of $BaCO_3$ (or $BaC_2O_4$, etc), $Al_2O_3$, and $SiO_2$ and then heating the mixture at from 1250° C. to 1500° C. until the transformation to monoclinic $BaO \cdot Al_2O_3 2SiO_2$ is completed.

DETAILED DESCRIPTION OF THE PREFERRED EMBODIMENT

The process of this invention involves the addition of pure monoclinic celsian ($BaO \cdot Al_2O_3 \cdot 2SiO_2$) seed crystals to a stoichiometric mixture of powders of (1) a BaO source which is a barium salt, (2) $Al_2O_3$, and (3) $SiO_2$. High purity commercially available ingredients are used. Moreover, no additives are used which would remain as impurities in the final product. As a result, the monoclinic $BaO \cdot Al_2O_3 \cdot 2SiO_2$ product has a low and thermally stable dielectric constant and loss tangent.

The barium salt is one that is conventionally used as a source of BaO in the preparation of celsian ($BaO \cdot Al_2O_3 \cdot 2SiO_2$). Preferred salts are $BaCO_3$, $BaC_2O_4$, or mixtures thereof, with $BaCO_3$ being the most preferred salts. The powder size is not critical because the barium salt decomposes before the reaction starts. Any commercially available, chemically pure grade of barium salt (for example, $BaCO_3$, $BaC_2O_4$) is suitable.

Conventional, pure, fine-grained $Al_2O_3$ powder is suitable for this process. For example, $Al_2O_3$ polishing powder, type A from Fisher Scientific Co. is suitable. This powder is 99.99 percent pure $Al_2O_3$ having a particle size of 0.3 microns.

The type of $SiO_2$ used is important. Fused silica powder can be used in the process with from 15 to 20 weight percent of the monoclinic $BaO \cdot Al_2O_3 \cdot 2SiO_2$ seeds being required to cause a complete transformation to monoclinic $BaO \cdot Al_2O_3 \cdot 2SiO_2$ in 5 hours at 1300° C. In contrast, when $SiO_2$ gel is used, only 5 percent by weight of monoclinic $BaO \cdot Al_2O_3 \cdot 2SiO_2$ seed crystals is required for the transformation to monoclinic $BaO \cdot Al_2O_3 \cdot 2SiO_2$ in 5 hours at 1250° C. In the examples, the fused $SiO_2$ (Thermo Materials Corp.) was 99.75% pure with an average particle size of 8.03 microns (90% less than 34 microns). The silica gel may be prepared by the ammonia catalized hydrolysis of tetraethylorthosilicate, $Si(OCH_2CH_3)_4$. The mixture may be dried and ground into a suitable powder. In the examples, a solution of $Si(OCH_2CH_3)_4$ in ethanol was added to an $NH_4OH$-stablized suspension of $Al_2O_3$ and $BaCO_3$ powders. The $SiO_2$ gel precipitates onto the particles of $Al_2O_3$ and $BaCO_3$.

The seed crystals used in this invention are pure monoclinic $BaO \cdot Al_2O_3 \cdot 2SiO_2$ which is ground into a fine powder. In the examples, the particle size was less than 60 microns. Even smaller particle sizes are preferred for the process. a starting batch of pure monoclinic $BaO \cdot Al_2O_3 \cdot 2SiO_2$ for seed crystals can be prepared by heating a stoichiometric mixture of raw powders of $BaCO_3$, $Al_2O_3$, and fused $SiO_2$ (8 microns) at 1500° C. for 150 hours. After that, the pure monoclinic $BaO \cdot Al_2O_3 \cdot 2SiO_2$ produced according to the process of this invention can be used for seeds.

The minimum amount of monoclinic $BaO \cdot Al_2O_3 \cdot 2SiO_2$ seed crystals which can be used in this process depends on the form of the $SiO_2$ used. If fused $SiO_2$ is used, at least 15–20 weight percent of the reaction mixture must be seed crystals for complete conversion to monoclinic $BaO.Al_2O_3.2SiO_2$ at 1300° C. in 5 hours. In contrast, if $SiO_2$ gel is used, 5 weight percent of seed crystals in the reaction mixture will produce a complete transformation to monoclinic $BaO.Al_2O_3.2SiO_2$ when heated at 1250° C. for 5 hours. Technically the upper limit for seed crystals (for either gel or fused $SiO_2$) is any amount less than 100 weight percent of the mixture. As a practical, economic matter, the minimum amount necessary to produce a complete transformation into monoclinic $BaO.Al_2O_3.2SiO_2$ is used. When fused $SiO_2$ is used, preferably from 15 to 30 and more preferably from 20 to 25 weight percent of monoclinic $BaO.Al_2O_3.2SiO_2$ seed crystals will be used in the reaction mixture. When silica gel is used, preferably from 5 to 20, and more preferably from 5 to 10 weight percent of monoclinic $BaO.Al_2O_3.2SiO_2$ seed crystals are used in the reaction mixture.

The reaction between the $BaCO_3$, $Al_2O_3$, and $SiO_2$ occurs in the solid state. To facilitate this reaction, the intimate mixture of $BaCO_3$, $Al_2O_3$, and $SiO_2$ powders is pressed into pellets (or other suitable shapes). After the firing, the product monoclinic $BaO.Al_2O_3.2SiO_2$ pellets are ground into powders for use in ceramic processes or for use as seed crystals for producing more monoclinic $BaO.Al_2O_3.2SiO_2$.

When $SiO_2$ gel is used the temperature range for the process is from 1250° C. to 1585° C. and preferably from 1250° C. to 1500° C. However, when fused $SiO_2$ is used, the temperature range for the process is from 1300° C. to 1585° C. and preferably from 1300° C. to 1500° C.

The general nature of the invention having been set forth, the following examples are presented as specific illustrations thereof. It will be understood that the invention is not limited to these specific examples but is susceptible to various modifications that will be recognized by one of ordinary skill in the art.

Starting mixtures for the preparation of high purity stoichiometric celsian consisted of $BaCO_3$ (or $BaC_2O_4$), $Al_2O_3$ and $SiO_2$ (fused or gel). $BaC_2O_4$ can be precipitated from $Ba(NO3)_2$ and $H_2C_2O_4$. The $Al_2O_3$ (polishing powder, Type A from Fisher Scientific Co.) used was 99.99% pure with particle size 0.3 microns. Fused $SiO_2$ powder (Thermo Materials Corp.) was 99.75% pure with average particle size of 8.03 microns (90% less than 34 microns). Silica gel was prepared by the hydrolysis of tetraethylorthosilicate—$Si(OCH_2CH_3)_4$ (Silbond 40 from Stauffer Chemical Co.).

The preparation of stoichiometric mixtures based on fused $SiO_2$ consisted of the sequential addition of $BaCO_3$ (or $BaC_2O_4$) and $Al_2O_3$ powders to a $SiO_2$ aqueous suspension, mixing, filtering, and vacuum drying at 65°-70° C. The mixtures based on $SiO_2$ gel were prepared by the addition of $BaCO_3$ (or $BaC_2O_4$) and Silbond 40 solution in ethanol to a $NH_4OH$-stabilized $Al_2O_3$ suspension (pH 11). Ammonia served as a catalyst for the hydrolysis of tetraethylorthosilicate. The mixture was continuously stirred until the hydrolysis was completed. Then, the mixtures were vacuum dried at 65°-70° C. The resulting dry raw powders were uniform and did not contain any agglomerates. The surface area determined by BET method was 6-8 and 20-22 $m^2/g$ for the powders based on fused $SiO_2$ and $SiO_2$ gel, respectively.

EXAMPLE 1

Preparation of monoclinic $BaO.Al_2O_3.2SiO_2$ seed crystals

A uniform, stoichiometric, raw powder mixture of $BaCO_3$, $Al_2O_3$ (0.3 microns), and fused $SiO_2$ (8 microns) was prepared by mixing the $BaCO_3$ and $Al_2O_3$ powder into an aqueous suspension of the fused $SiO_2$ powder. The resulting mixture of powders was then collected by filtration and dried at 65°-75° C. The uniform mixture of $BaCO_3$, $Al_2O_3$, and fused $SiO_2$ powders was then pressed at 100 MPa into pellets. The pellets were then fired at 1500° C. for about 150 hours to produce pure monoclinic $BaO.Al_2O_3.2SiO_2$. The resulting pellets were then ground to a particle size less than 60 microns for use as seeds in examples 3 and 5.

EXAMPLE 2

Standard $SiO_2$ gel preparation of $BaO.Al_2O_3.2SiO_2$

A uniform, stoichiometric, raw powder mixture of $BaCO_3$, $Al_2O_3$ (partical size 0.3 microns), and $SiO_2$ gel was prepared by the addition of $BaCO_3$ powder and Silbond 40 solution in ethanol to a $NH_4OH$-stabilized $Al_2O_3$ suspension (pH 11). Ammonia served as a catalyst for the hydrolysis of tetraethylorthosilicate. The mixture was continuously stirred until the hydrolysis was completed. Then the mixture was vacuum dried at 65°-70° C. The resulting dry raw powders were uniform and did not contain any agglomerates. The surface area determined by BET method was 20-22 $m^2/g$. This raw powder was used in this example and in the example 3.

The raw powder mixture was pressed at 100 MPa into pellets and then fired at 1050°-1500° C. for 5 hours. X-ray diffractograms showed that formation of $BaO.Al_2O_3.2SiO_2$ was completed at 1250° C. However, specimens contained only hexagonal modifications, even after firing at 1500° C. for 150 hours.

EXAMPLE 3

Preparation of monoclinic $BaO.Al_2O_3.2SiO_2$ from $SiO_2$ gel using monoclinic seeds Into a uniform, stoichiometric, raw powder mixture of $BaCO_3$, $Al_2O_3$ (0.3 microns), and $SiO_2$ gel, prepare as described in example 2, was added the monoclinic $BaO.Al_2O_3.2SiO_2$ seed crystals (less than 60 microns in size) prepared in example 1. Batches containing 1, 3, 5, 7, 10, 15, and 20 percent by weight of the monoclinic $BaO.Al_2O_3.2SiO_2$ seed crystals were prepared, pressed into pellets at 100 MPa, and then fired at 1250°-1500° C. for 5 hours. The addition of monoclinic seeds highly intensified the formation of monoclinic $BaO.Al_2O_3.2SiO_2$. Even the presence of 1 percent seeds significantly promoted the phase transfer from hexagonal to monoclinic $BaO.Al_2O_3.2SiO_2$ at 1250° C. Total phase transformation was accomplished by the addition of at least 5 percent by weight of the monoclinic $BaO.Al_2O_3.2SiO_2$ seed crystals. This was demonstrated by the batches containing 5 and 10 percent by weight of the seed crystals. Note that the completely transformed, 100 percent monoclinic $BaO.Al_2O_3.2SiO_2$ product can be ground to particles less than 60 microns in size and used as seed crystals for subsequent batches. In other words, the arduous process of example 1 is needed only to prepare an initial batch of monoclinic $BaO.Al_2O_3.2SiO_2$.

EXAMPLE 4

Standard fused $SiO_2$ preparation of $BaO.Al_2O_3.2SiO_2$

A uniform, stoichiometric, raw powder mixture was prepared by adding $BaCO_3$ and $Al_2O_3$ powders to fused $SiO_2$ aqueous suspension, mixing, filtering, and vacuum drying at 65°–70° C. The raw powder mixture was pressed at 100 MPa into pellets and fired. After firing at 1200°–1250° C. the product was hexagonal $BaO.Al_2O_3.2SiO_2$. The product contained gradually increasing amounts of monoclinic $BaO.Al_2O_3.2SiO_2$ after firing at above 1300° C. However, after firing at 1500° C. for five hours, the product still contained noticeable amounts of hexagonal $BaO.Al_2O_3.2SiO_2$.

EXAMPLE 5

Preparation of monoclinic $BaO.Al_2O_3.2SiO_2$ from fused $SiO_2$ using monoclinic seeds Into a uniform, stoichiometric, raw powder mixture of $BaCO_3$, $Al_2O_3$ (0.3 micron), and fused $SiO_2$, prepared as described in example 4, was added the monoclinic $BaO.Al_2O_3.2SiO_2$ seed crystals (less than 60 microns in size) prepared in example 1. Batches containing a variety of weight percentages of monoclinic seed were prepared, pressed into pellets at 100 MPa, and fired. It was determined that temperatures above 1300° C. and a monoclinic seed content of 15–20 weight percent is needed for the complete conversion of hexagonal into monoclinic $BaO.Al_2O_3.2SiO_2$.

Obviously numerous modifications and variations of the present invention are possible in light of the above teachings. It is therefore to be understood that within the scope of the appended claims the invention may be practiced otherwise than as specifically described herein.

What is claimed is:

1. A process for producing monoclinic $BaO.Al_2O_3.2SiO_2$ comprising:
   A. forming a reaction mixture of
      (1) from 5 to less than 100 weight percent of monoclinic $BaO.Al_2O_3.2SiO_2$ seeds, with the remainder being
      (2) a uniform, stoichiometric powder mixture of
         (a) a barium salt selected from the group consisting of $BaCO_3$, $BaC_2O_4$, and mixtures thereof,
         (b) $Al_2O_3$, and
         (c) $SiO_2$ gel;
   B. heating the reaction mixture at a temperature of from 1250° C. to 1585° C. until a pure monoclinic $BaO.Al_2O_3.2SiO_2$ product is produced.

2. The process of claim 1 wherein the monoclinic $BaO.Al_2O_3.2SiO_2$ seeds are less than 60 microns in size.

3. The process of claim 1 wherein the monoclinic $BaO.Al_2O_3.2SiO_2$ seeds comprise from 5 to 20 weight percent of the reaction mixture, with the stoichiometric, powder mixture of barium salt, $Al_2O_3$, and $SiO_2$ gel being the remainder.

4. The process of claim 3 wherein the monoclinic $BaO.Al_2O_3.2SiO_2$ seeds comprise from 5 to 10 weight percent of the reaction mixture, with the stoichiometric, powder mixture of barium salt, $Al_2O_3$, and $SiO_2$ gel being the remainder.

5. The process of claim 1 wherein the barium salt is $BaCO_3$.

6. The process of claim 1 wherein the reaction mixture is heated at from 1250° C. to 1500° C.

7. The process of claim 6 wherein the reaction mixture is heated at from 1250° C. to 1500° C. for from 4 to 6 hours.

8. The process of claim 7 wherein the reaction mixture is heated at 1250° C. to 1500° C. for about 5 hours.

9. A process for producing monoclinic $BaO.Al_2O_3.2SiO_2$ comprising:
   A. forming a reaction mixture comprising
      (1) from 15 to less than 100 percent weight percent of monoclinic $BaO.Al_2O_3.2SiO_2$ seeds, with the remainder being
      (2) a uniform stoichiometric powder mixture of
         (a) a barium salt selected from the group consisting of $BaCO_3$, $BaC_2O_4$, and mixtures thereof,
         (b) $Al_2O_3$, and
         (c) fused $SiO_2$;
   B. heating the reaction mixture at a temperature of from 1300° C. to 1585° C. until a pure monoclinic $BaO.Al_2O_3.2SiO_2$ product is produced.

10. The process of claim 9 wherein the monoclinic $BaO.Al_2O_3.2SiO_2$ seeds are less than 60 microns in size.

11. The process of claim 9 wherein the monoclinic $BaO.Al_2O_3.2SiO_2$ seeds comprise from 15 to 30 weight percent of the reaction mixture with the stoichiometric powder mixture of barium salt, $Al_2O_3$, and fused $SiO_2$ being the remainder.

12. The process of claim 9 wherein the monoclinic $BaO.Al_2O_3.2SiO_2$ seeds comprise from 20 to 25 weight percent of the reaction mixture with the stoichiometric powder mixture of barium salt, $Al_2O_3$, and fused $SiO_2$ being the remainder.

13. The process of claim 9 wherein the barium salt is $BaCO_3$.

14. The process of claim 9 wherein the reaction mixture is heated at from 1300° C. to 1500° C.

15. The process of claim 14 wherein the reaction mixture is heated at 1300° C. to 1500° C. for 4 to 6 hours.

16. The process of claim 15 wherein the reaction mixture heated at 1300° C. to 1500° C. for about 5 hours.

* * * * *